(12) United States Patent
Hindley et al.

(10) Patent No.: US 7,732,189 B2
(45) Date of Patent: Jun. 8, 2010

(54) METHOD OF TREATING RADIOACTIVE WASTE

(75) Inventors: Michael Philip Hindley, Centurion (ZA); Andrzej Leszek Kuczynski, Menlo Park (ZA); Francis Pieter Van Ravenswaay, Vanderbijlpark (ZA)

(73) Assignee: Pebble Bed Modular Reactor (Proprietary) Limited, Centurion (ZA)

( * ) Notice: Subject to any disclaimer, the term of this patent is extended or adjusted under 35 U.S.C. 154(b) by 355 days.

(21) Appl. No.: 11/597,914

(22) PCT Filed: May 13, 2005

(86) PCT No.: PCT/IB2005/051570

§ 371 (c)(1),
(2), (4) Date: Aug. 29, 2007

(87) PCT Pub. No.: WO2005/119700

PCT Pub. Date: Dec. 15, 2005

(65) Prior Publication Data

US 2008/0113423 A1     May 15, 2008

(30) Foreign Application Priority Data

May 30, 2004   (ZA) .................................. 2004/3296

(51) Int. Cl.
*A62D 3/00* (2007.01)
*A62D 3/02* (2007.01)
*B09B 3/00* (2006.01)
*B09C 1/10* (2006.01)

(52) U.S. Cl. .................................................. 435/262.5

(58) Field of Classification Search .............. 435/262.5; 376/325; 252/625

See application file for complete search history.

(56) References Cited

U.S. PATENT DOCUMENTS 4,246,238 A    1/1981    Goldacker et al.

(Continued)

FOREIGN PATENT DOCUMENTS

EP         0 286 358 A      10/1988

(Continued)

OTHER PUBLICATIONS

N.V Ashley et al (Review of biotechnology application s to nuclear waste treatment, Jan. 2, 1990; 49(4) : 381-94).*

(Continued)

*Primary Examiner*—Walter D Griffin
*Assistant Examiner*—Shanta G Doe
(74) *Attorney, Agent, or Firm*—Millen, White, Zelano & Branigan, P.C.

(57) ABSTRACT

This invention relates to a method of treating irradiated material which includes reducing irradiated material to particulate form, suspending the particulate irradiated material, or derivatives thereof, in a fluid to form a suspension, and removing radioisotopes from the suspension by biological treatment.

43 Claims, 6 Drawing Sheets

U.S. PATENT DOCUMENTS

Figure 1:
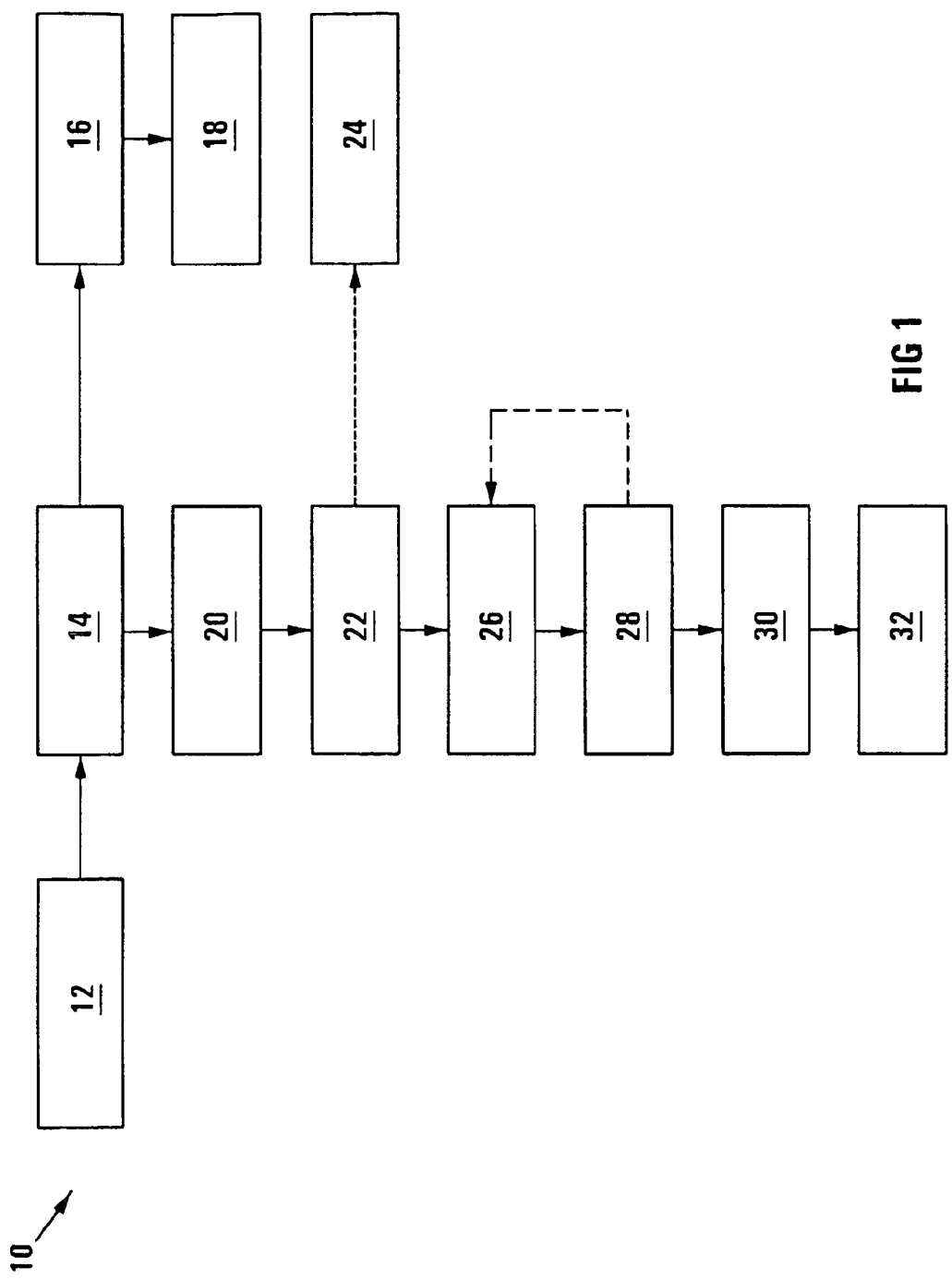

| | | |
|---|---|---|
| 4,988,372 A | 1/1991 | Meline et al. |
| 5,225,167 A | 7/1993 | Wetzel et al. |
| 5,292,456 A | 3/1994 | Francis et al. |
| 5,414,196 A | 5/1995 | Jennings |
| 5,707,592 A | 1/1998 | Someus |
| 5,875,406 A | 2/1999 | Weber |
| 5,948,259 A | 9/1999 | Deguitre et al. |
| 6,387,274 B1 | 5/2002 | Hendricks et al. |
| 6,625,248 B2 | 9/2003 | Mason et al. |
| 6,692,718 B1 | 2/2004 | Osawa |
| 2003/0138068 A1 | 7/2003 | Buttsev et al. |

FOREIGN PATENT DOCUMENTS

| | | |
|---|---|---|
| RU | 2 156 644 C1 | 9/2000 |
| WO | WO 00/00896 | 1/2000 |

OTHER PUBLICATIONS

Batuev et al ,Effect of current source characteristics on powder particles , translated from Poroshovaya Metallurgiya , No. 1(265), pp. 5-10 Jan. 1985.*

Vanderberg L. Al et al., Treatment of Heterogeneous Mixed Wastes: Enzyme Degradation of Cellulosic Materials Contaminated with Hazardous Organics and Toxic and Radioactive Metals, American Chemical Society, Easton Pa, vol. 33, No. 9, Apr. 15, 1999.

* cited by examiner

METHOD OF TREATING RADIOACTIVE WASTE

THIS INVENTION relates to a method of treating radioactive waste. More particularly, the invention relates to a method of treating irradiated graphite material, to a method of treating irradiated structural material from a nuclear reactor, to a method of treating radioactive waste and to a method of treating spent nuclear fuel elements.

According to one aspect of the invention, there is provided a method of treating irradiated material, which method includes the steps of reducing irradiated material to particulate form to yield particulate irradiated material;

suspending the particulate irradiated material or derivatives thereof, in a fluid to form a suspension; and removing radioisotopes from the suspension by biological treatment.

Typically the irradiated material will be graphite material derived from a structural component of a nuclear reactor, eg. a reactor core central moderator column or a top, side or bottom reflector of a reactor core, from a nuclear fuel element comprising graphite and fissile material (incorporated in fuel particles) or from moderator elements. The graphite starting material will thus typically be in the form of blocks, in the case of graphite derived from structural components, or spheres, in the case of nuclear fuel elements and moderator elements.

The method may include the step of reducing the size of the particulate irradiated material suspended in the fluid prior to removing radioisotopes from the suspension. Reducing the size of the particulate irradiated material may include milling or grinding the particles in suspension.

Where the irradiated material is derived from nuclear fuel elements comprising graphite material and fuel particles dispersed therein, typically both graphite particulate irradiated material, or derivatives thereof, and fuel particles will be present in the fluid suspension and the method may then include the step of separating the fuel particles out of the suspension prior to removing the radioisotopes from the suspension or prior to reducing the size of the graphite particulate irradiated material in suspension, as the case may be.

The method may include exposing the separated fuel particles to neutron radiation in order to induce nuclear transmutations of fission products to shorter-lived species. The neutron radiation may have an energy of at most 4 eV. The method may include extracting heat generated during neutron uptake by the fission products for use in downstream or external processes.

The irradiated material may be reduced to particulate irradiated material comprising particles having a size of at most about 3 mm. Reducing the irradiated material to particulate irradiated material may include crushing the irradiated material. Instead, reducing the irradiated material to particulate form may include suspending the irradiated material in a liquid medium and subjecting the irradiated material to mechanical vibrations. The vibrations may be low frequency vibrations. Instead, the vibrations may be high frequency, or ultrasonic, vibrations. In another embodiment, the irradiated material may be reduced to particulate form by means of high frequency pulsating electric fields eg. 'artificial lightening'. In still another embodiment, reducing the irradiated material to particulate form may include heating the irradiated material and applying a low temperature fluid to a surface of the heated irradiated material. More particularly, the low temperature fluid may be liquid helium. The liquid helium may be pressurised. The irradiated material may be heated by means of microwave radiation.

In yet another embodiment, reducing the irradiated material to particulate form may include cooling the irradiated material to a temperature of between about −250 degrees Celsius and about −270 degrees Celsius and thereafter rapidly heating the irradiated material to a temperature of between about 180 degrees Celsius and about 200 degrees Celsius. Cooling the irradiated material may include immersing the irradiated material in a cooling fluid at a temperature of between about −250 degrees Celsius and about −270 degrees Celsius. Rapidly heating the irradiated material may include immersing the irradiated material in a fluid medium which is heated to between about 180 degrees Celsius and about 200 degrees Celsius.

Suspending the particulate irradiated material or derivatives thereof in fluid may include forming an emulsion of the particulate irradiated material in a liquid. The liquid may be provided by an emulsifier/surfactant, such as that available under the name 'EKOL35N'. The method may include the step of, prior to forming the emulsion, heating the particulate irradiated material to about 200 degrees Celsius. Typically the irradiated material will include graphite material comprising natural graphite and pyrolytic graphite bound by a carbonised resin. The carbonised resin, as well as bonds in the graphite crystal structure, may be broken down by the emulsifier whilst the graphite particulate material is in suspension in the emulsifier.

Instead, suspending the particulate irradiated material or derivatives thereof in a fluid may include heating the particulate irradiated material in the presence of an oxidising agent, such as, for example, fluorine or oxygen gas, to yield particulate irradiated material derivatives in a gaseous suspension, eg. carbon compound graphite particle derivatives and/or gaseous oxidation products of carbon such as CO and $CO_2$. The particulate irradiated material may be heated under pressure.

Removing radioisotopes from the suspension may include directing the suspension along a flow path, deflecting radioisotopes from the suspension towards an isotope collection zone defined along a length of the flow path, and collecting isotopes in the isotope collection zone.

Collecting the radioisotopes may include embedding the isotopes in an isotope deposition bed. The isotope deposition bed may include at least one layer of an isotope diffusion-resistant material. The isotope-diffusion resistant material may be selected from the group consisting of graphite, chromium, platinum, a chromium alloy, silicon carbide, SiN, SiFC and carbon diamonds. Preferably the isotope deposition bed comprises a first layer of graphite, a second layer of a material selected from the group consisting of chromium, platinum, a chromium alloy, mercury and liquid sodium, and a third layer of a material selected from the group consisting of silicon carbide, SiN, SiFC and diamond. The second layer may provide an intermediate layer sandwiched between the first layer and the third layer. The first layer will typically provide an operatively inner layer and the third layer will typically provide an operatively outer layer adjacent to the flow path. In one embodiment, the isotope deposition bed includes at least one layer of fluid deposition material, the method then including removing and replacing the fluid deposition material of the isotope deposition bed. More particularly, the method may include circulating the fluid deposition material. Circulating the fluid deposition material may include subjecting the fluid deposition material to a secondary isotope removal step, which includes directing the fluid deposition material along a flow path, deflecting isotopes from the fluid deposition material towards an isotope collection zone or series of isotope collection zones defined along a length of the flow path, and collecting isotopes in the isotope collection zone.

Instead, collecting the radioisotopes may include providing an endless passage and channeling the isotopes therein. Channeling the radioisotopes in the endless passage may include applying a magnetic field across the endless passage.

Deflecting the radioisotopes from the suspension may include applying a magnetic field across the flow path such that charged isotopes are magnetically deflected in the flow path. Where the isotopes are magnetically deflected into the isotope collection zone, the method may include the prior step of passing the suspension, containing the radioisotopes, through an isotope ioniser, such as, for example, a neutron source or an electromagnetic radiation, more particularly, X-ray or UV, emitter.

Applying the magnetic field may include arranging at least one permanent magnet in magnetic deflecting relationship with the flow path. Instead, applying the magnetic field may include arranging at least one electromagnet in magnetic deflecting relationship with the flow path. Applying the magnetic field may then include pulsating the magnetic field.

Removing radioisotopes from the suspension by biological treatment may include separating the particulate irradiated material out of suspension, mixing the so-separated particulate irradiated material with water to yield a slurry, and thereafter biologically treating the slurry. Where the suspension comprises derivatives of the particulate irradiated material in gaseous suspension, removing radioisotopes from the suspension by biological treatment may include dissolving the gaseous suspension in water to yield a slurry and thereafter biologically treating the slurry.

Biologically treating the slurry may include passing the slurry through a biofilter. By "biofilter" is to be understood a filtration device which employs living organisms, eg. bacteria, to consume/break down the particles in the slurry as well as capturing contaminants to be removed from the slurry. More particularly, the organisms/bacteria may capture radioisotopes, eg. atoms heavier than carbon-12, such as carbon-14, contained in the slurry. Typically, the biofilter will comprise membranous filter elements impregnated with microorganisms and/or slurry flow channels coated with microorganisms through or along which the slurry will be made to pass.

The method may include measuring levels of radioisotopes present in the slurry after biological treatment of the slurry and, where the levels exceed a predetermined maximum value, recycling the slurry for further biological treatment.

The invention will now be described, by way of example, with reference to the accompanying diagrammatic drawings.

In the drawings,

FIG. 1 shows a schematic representation of sequential steps in a method of treating irradiated graphite material in accordance with the invention;

FIG. 2 shows a schematic representation of sequential steps in another method of treating irradiated graphite material in accordance with the invention;

FIG. 3 shows a three-dimensional view of part of the flow path along which a suspension is made to pass in accordance with a method of the invention;

FIG. 4 shows a longitudinal section through part of a flow path along which a suspension is made to pass in accordance with a method of the invention;

FIG. 5 shows a schematic view of a magnetic field applied across the part of the flow path of FIG. 3 in accordance with the method of the invention and of charged particle deflections in that part of the flow path in three-dimensional longitudinal section; and FIG. 6 shows a longitudinal section through part of another flow path along which a suspension is made to pass in accordance with a method of the invention.

In FIG. 1, reference numeral 10 refers generally to a method of treating irradiated graphite material in accordance with the invention. At 12, irradiated graphite material, typically originating from a structural component of a nuclear reactor, eg. a reactor core centre column or side reflector, from a graphite moderator element, or from a nuclear fuel element comprising graphite and fissile material, incorporated in fuel particles, is reduced to particulate form. The graphite starting material is typically in the form of blocks, where the material is derived from a nuclear reactor structural component, or spheres in the case of nuclear fuel elements or moderator elements. However, the invention is also applicable to graphite of other shapes.

In one method of the invention, the graphite material is reduced to particulate form at 12 by mechanical crushing by use of a bell-crusher, jaw-crusher, or the like. This method is typically used for graphite blocks of reactor structural material or moderator elements, and thus not for graphite starting material incorporating fuel particles. The blocks, of size about 2 m×1 m×1 m, or moderator elements are inserted into the crusher and are reduced to particles of size at most about 3 mm.

In another method of the invention, at 12 the graphite material is suspended in a liquid medium, which is typically provided by the suspension fluid (see below), and is subjected within the liquid medium to mechanical vibrations caused by low frequency waves which results in cracking of the graphite material to yield particles. This method is typically used for spherical nuclear fuel elements.

Instead, the graphite material within the liquid medium may be subjected to mechanical vibrations caused by high frequency, or ultrasonic, waves, which similarly result in cracking and reduction of the graphite material to particulate form. This method is typically used for graphite blocks of reactor structural material.

In yet another embodiment of the invention, the material to be reduced to particulate form is subjected to pulsating high frequency electric fields eg. artificial lightening.

In still another method, the graphite material is reduced to particulate form by heating thereof at 12, by means of microwave radiation to about 600 degrees Celsius, and simultaneously applying a low temperature fluid, such as pressurised liquid helium, eg. by spraying from nozzles, to a surface of the graphite material. This has the effect of cracking and 'peeling' layers of the graphite material in a rapid fashion. This method is typically used for both graphite blocks of reactor structural material and spherical nuclear fuel elements and moderator elements.

In yet another method, the graphite material is reduced to particulate form at 12 by cooling the graphite material to a temperature of between about −250 degrees Celsius and about −270 degrees Celsius by immersing the graphite material in a cooling fluid at this temperature, and thereafter rapidly heating the graphite material to a temperature of between about 180 degrees Celsius and about 200 degrees Celsius. The graphite material is heated rapidly, after cooling, by immersion in a fluid medium which is heated to between about 180 degrees Celsius and about 200 degrees Celsius and which, in one embodiment, is provided by the emulsifier (described below). This method is typically used for both graphite blocks of reactor structural material and spherical nuclear fuel elements and moderator elements.

At 14, the graphite particulate material is heated to between about 180 degrees Celsius and about 200 degrees Celsius and is suspended in a liquid provided by an emulsifier, thereby to form an emulsion of graphite particulate material in the liquid. The emulsifier may be the emulsifier available under the name 'EKOL35N'. Naturally, however, any other suitable emulsifier may be used. Typically the graphite material includes both natural graphite and pyrolytic graphite which are bound together by a carbonised resin. The emulsifier acts to break down the carbonised resin as well as bonds in the graphite crystal structure. The heat facilitates this breakdown process and the graphite particulate material yielded by the chemical breakdown is suspended in the emulsifier/liquid. At temperatures between 160 degrees Celsius and 200 degrees Celsius the emulsion/suspension has a viscosity comparable to that of water.

Where the graphite material is derived from nuclear fuel elements, fuel particles of fissile material which constituted part of the fuel elements and hence are held in suspension together with the graphite particulate material, are filtered from the suspension at 16. The fuel particles are optionally suspended in a helium carrier gas and fed through a transmutation reactor, or so-called "actinide incinerator", or are transferred to canisters to be passed through the transmutation reactor in bulk at 18. Here the fuel particles are exposed to neutron radiation in order to induce nuclear transmutations of long-life fission products contained in the fuel particles. The neutron radiation typically has an energy of at most 4 eV such that it induces neutron uptake without associated displacement of sub-atomic particles and attendant initiation of chain reactions. It will be appreciated that the neutron uptake renders long-life fission products/actinides contained in the fuel particles into radioactive species having shorter half lives. The Applicant believes that this will serve effectively to reduce the number of actinides present in the fuel particles to acceptable levels for long term storage. Typically heat is generated during such neutron uptake and nuclear transmutation, and this heat may be extracted for use in downstream or external processes, such as, for example, desalination or power generation processes.

At 20, the graphite particulate material suspension is fed through a milling apparatus and is subjected to one or more successive milling steps. The suspension is typically passed through a pump which pumps the suspension/emulsion through the milling apparatus. Each milling stage reduces the size of the graphite particulate material in the emulsion/suspension. After successive milling steps the graphite particles typically have a size of at most about 4 nanometers.

At 22, the refined suspension which contains radioisotopes is first passed through an isotope ioniser, provided, for example, by a photon source, a neutron source, a heat source or an electromagnetic radiation source, such as an X-ray- or UV-emitter. The suspension is next passed along a flow path in magnetic deflecting relationship with which is arranged a magnetic deflecting arrangement for deflecting charged particles, including charged radioisotopes, from the suspension. An isotope deposition bed is provided in the flow path into or towards which the charged particles are deflected and in which the charged particles are collected and retained. Radioisotopes are thus removed from the suspension at 22.

Figure 3:
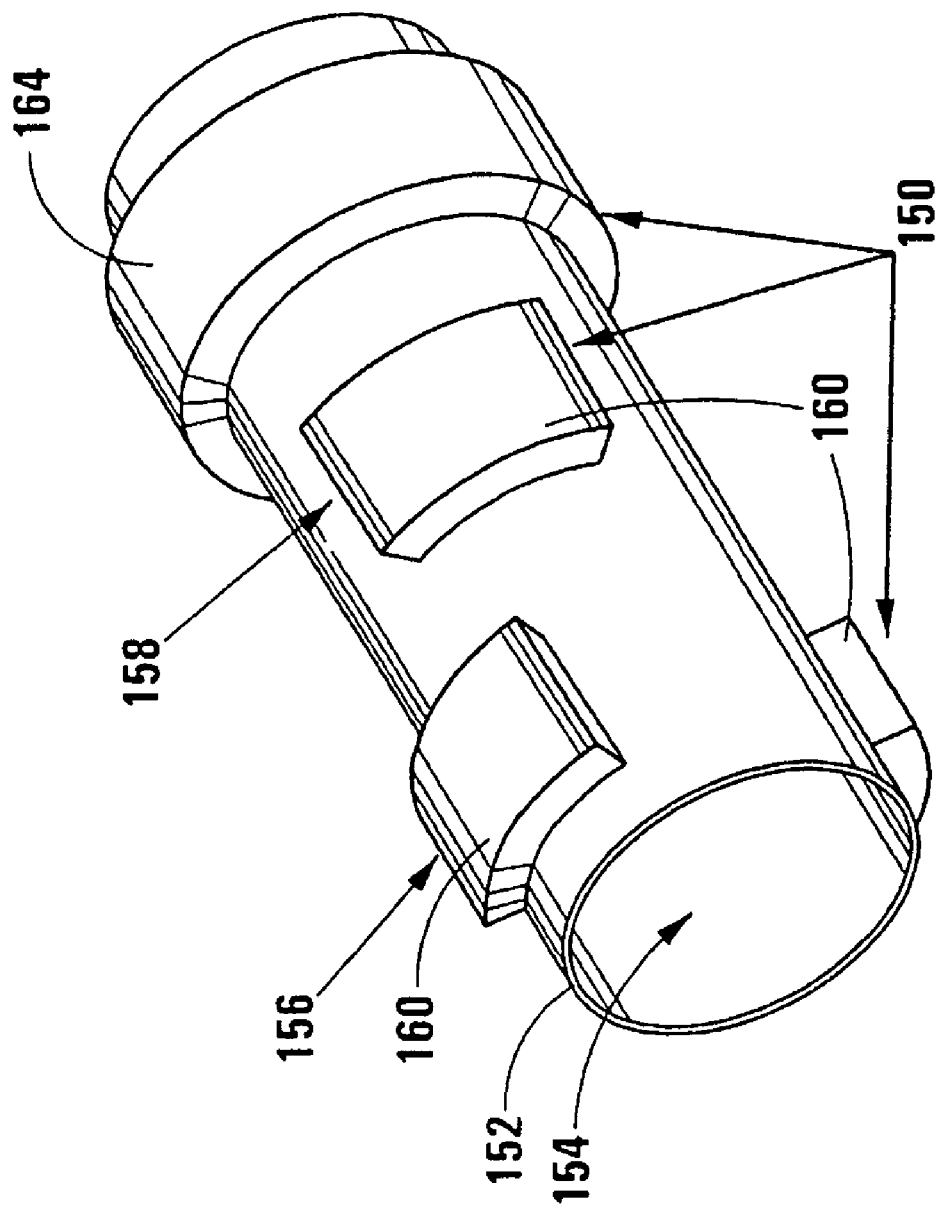

Reference is made to FIG. 3 of the drawings, in which reference numeral 150 refers generally to a magnetic deflection arrangement for use in the method of the invention. The magnetic deflection arrangement 150 includes magnets arranged around flow path defining means 152 defining the flow path 154 along which the suspension is directed. The magnets are permanent magnets. It is to be appreciated, however, that the magnets may instead be electromagnets. The magnetic deflection arrangement 150 includes two pairs 156, 158 of ring segment magnets 160 arranged adjacent to the flow path defining means 152 at longitudinally spaced positions. The magnets 160 of each pair 156, 158 are located at diametrically opposed positions and are arranged such that poles of opposite polarity of the magnets 160 face inwardly and outwardly, respectively. In this way, each pair of magnets 156, 158 has an outwardly directed north pole and an opposite outwardly directed south pole, and a corresponding inwardly directed south pole and opposite inwardly directed north pole, respectively. The poles of like polarity of the pairs 156, 158 of magnets 160 are angularly off-set. Preferably, as shown in FIG. 3, the poles of the magnets 160 of the pairs 156, 158 are off-set by about 45 degrees.

The magnetic deflection arrangement 30 includes also a toroidal magnet 164 arranged around the flow path defining means 152 and longitudinally spaced from the pairs of magnet 156, 158. The magnetic deflection arrangement 150 generates a magnetic field in the flow path 154. It will be appreciated that a particle having a charge, such as an ionised radioisotope in the suspension, and moving with a velocity through the magnetic field will experience a force and be deflected from its path of travel towards an internal surface of the flow path defining means 152.

Figure 4:
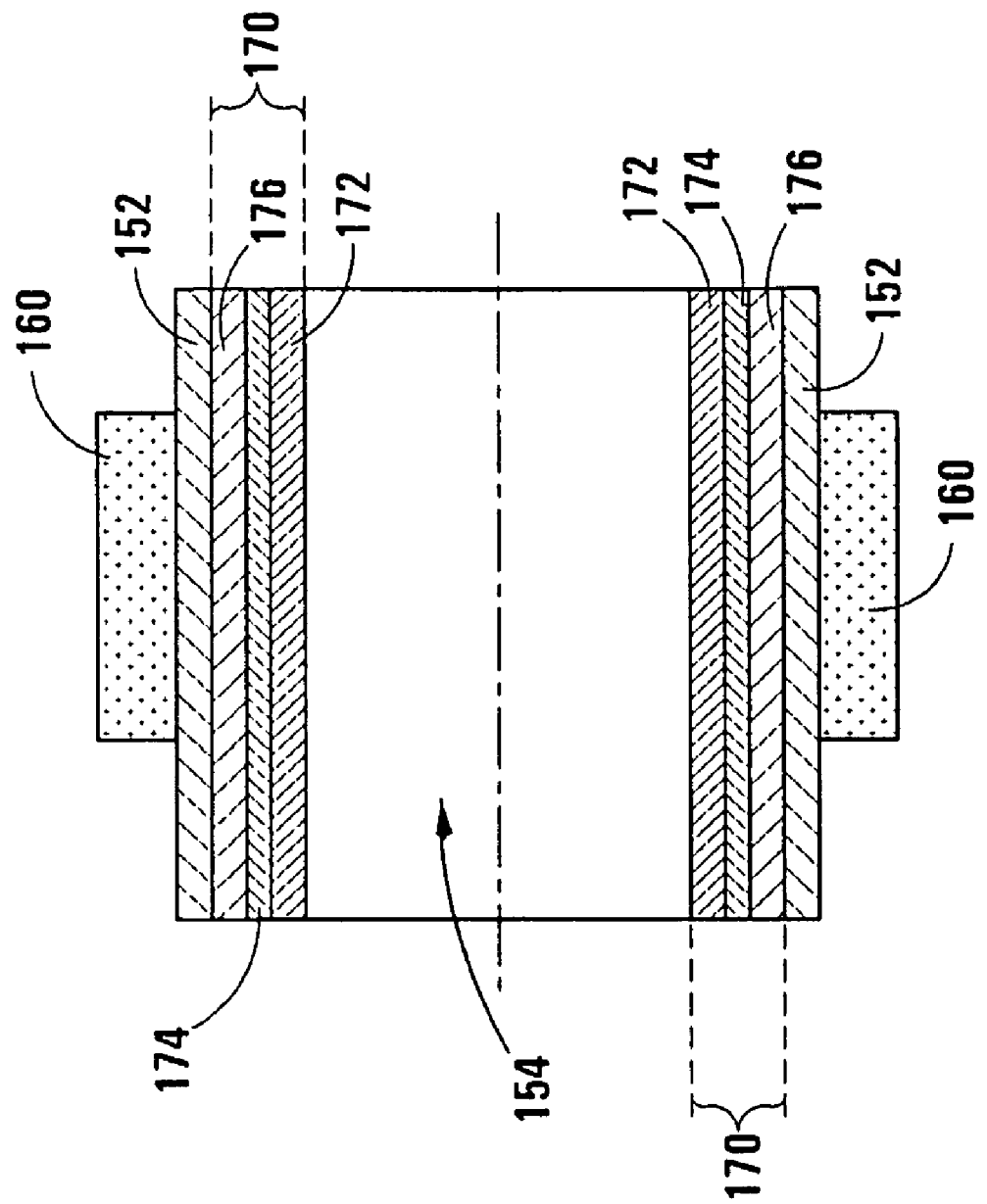

FIG. 4 of the drawings shows part of the flow path defining means 152 in longitudinal cross-section and, unless otherwise indicated, the same reference numerals used above in relation to FIG. 3 are used to designate similar parts. An internal surface of the flow path defining means 152 has a deposition lining 170 provided thereon. The deposition lining 170 defines an isotope deposition bed which provides in turn a collection zone into which ionised radioisotopes can be deflected and embedded (ie. collected and retained) thereby to be removed from the suspension.

The deposition lining 170 comprises a plurality of layers of materials which resist radioisotope diffusion therethrough. In a preferred embodiment, the lining 170 includes a radially innermost layer 172 of graphite, providing an ionised isotope landing zone and a decelerator for the radioisotopes. The layer 172 may, however, instead be comprised of any other suitable soft temperature-resistant material. An intermediate layer 174 of chromium is sandwiched between the graphite layer 172 and an outer layer of silicon carbide 176. Instead of chromium, platinum or an alloy resistant to radiation damage, such as a Specialty Chromium Alloy, may be used. In still another embodiment, the intermediate layer 174 is of a fluid deposition material, such as, for example, mercury or liquid sodium. The fluid deposition material is typically circulated and subjected to a secondary isotope removal step during circulation, in which the fluid deposition material is passed along a flow path, similarly to the graphite particle suspension, through a magnetic deflecting arrangement, by which isotopes contained in the fluid deposition material (entrained therein having been removed from the graphite particle suspension) are deflected towards an isotope collection zone to be collected therein. Silicon carbide provides an outer barrier layer 176 for inhibiting diffusion of ionised isotopes and other ions through the flow path defining means 152. Instead of silicon carbide, the outer layer may be comprised of SiN, SiFC or diamond.

Figure 6:
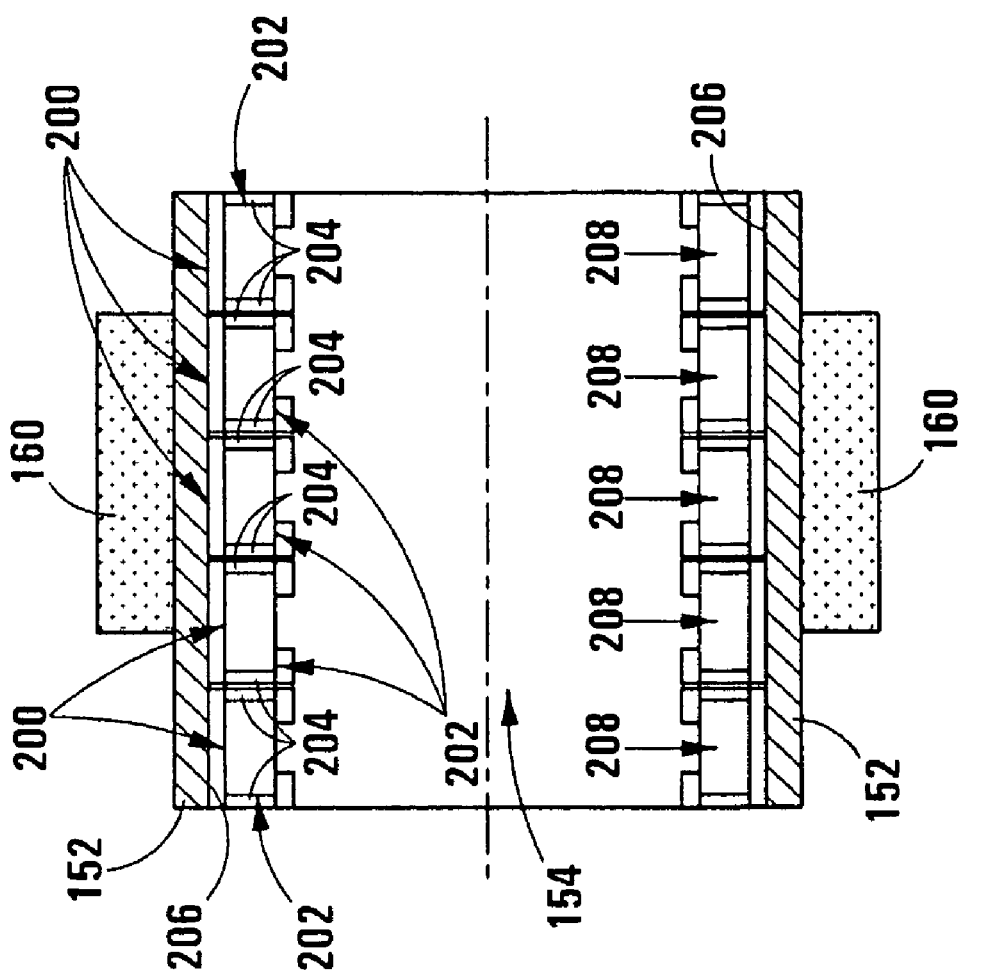

In another embodiment of the invention, shown in FIG. 6 of the drawings, an isotope collection zone is instead provided by a series of longitudinally spaced magnetic traps 200 provided on an internal surface 206 of the flow path defining means 152, each magnetic trap 200 being provided by a channel-section ring formation 202, having magnetic internal walls 204. The ring formations 202 are arranged in side-by-side relationship against an internal surface 206 of the flow path defining means 152 so as to extend circumferentially around the flow path defining means 152 and define longitudinally spaced peripheral channels 208, each providing an endless passage. A magnetic field is generated within each channel 208 by the magnetic internal walls 204 thereof such that an ionised isotope deflected into a channel 208, by the magnetic field applied across the flow path 154, will be displaced along the endless passage under the influence of the magnetic field of the channel 208.

Figure 5:
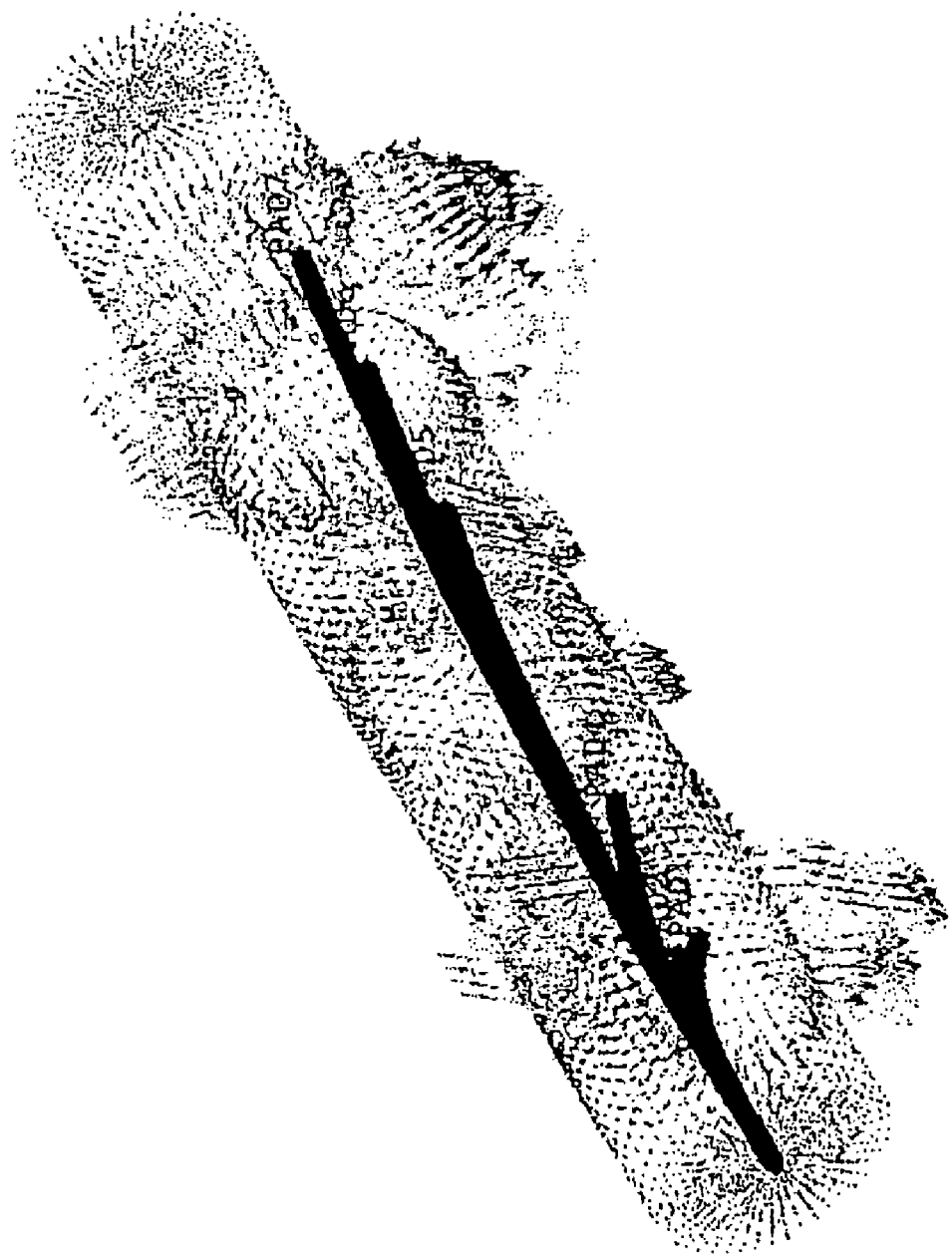

FIG. 5 of the drawings illustrates the magnetic field for the magnetic deflection arrangement 150 of FIG. 3 of the drawings. It illustrates also the paths of travel of deflected radioisotopes in the suspension. FIG. 5 is for illustrative purposes only, the particles for which deflection pathways are illustrated being simulated particles.

Radioisotopes removed at 22 are dried and compacted for long term storage at 24.

At 26, the graphite particulate material is separated out of the emulsion by addition of water to the emulsion in a separation tank. On addition of water, the emulsion settles into three distinct layers of emulsifier (uppermost), water (intermediate) and graphite particulate material settled on the bottom of the separation tank. Prior to passing to 26, a spectrometer check may be conducted on the emulsion. The graphite particulate material is collected at 28 and the process of separating the graphite particulate material out of emulsion is repeated to ensure that there is no lingering emulsifier on the graphite particles. At 30, the collected graphite particulate material is mixed with water to yield a slurry.

At 32, the slurry is biologically treated by passing the slurry through a biofilter filtration device employing bacteria, such as bacteria of the genus bacillus, to consume/break down the graphite particulate material in the slurry further as well as to capture radioisotopes, typically having atoms heavier than carbon-12 and more especially carbon-14, contained in the slurry. Any lingering emulsifier may impede the efficiency of the biofilter as a means of removal of particles heavier than carbon-12. In one embodiment, the biofilter comprises membranous filter elements, in the form of trays, impregnated with bacteria and through which the slurry is made to pass. In another embodiment, the biofilter defines slurry flow channels coated with bacteria along which the slurry is made to pass.

Preferably, the levels of radioisotopes present in the slurry after passing through the biofilter are detected and measured and compared with a predetermined maximum value, and where the predetermined maximum value is exceeded the slurry is recycled through the biofilter repeatedly until acceptable levels are attained. If the efficiency of the biofilter falls below a predetermined level this may be indicative of a fresh batch of bacteria being required.

Typically, the bacteria employed in the biofilter are killed by contact with the heavier atoms. In any event any surviving bacteria are extinguished immediately after biological treatment of the slurry to avoid mutation thereof.

Figure 2:
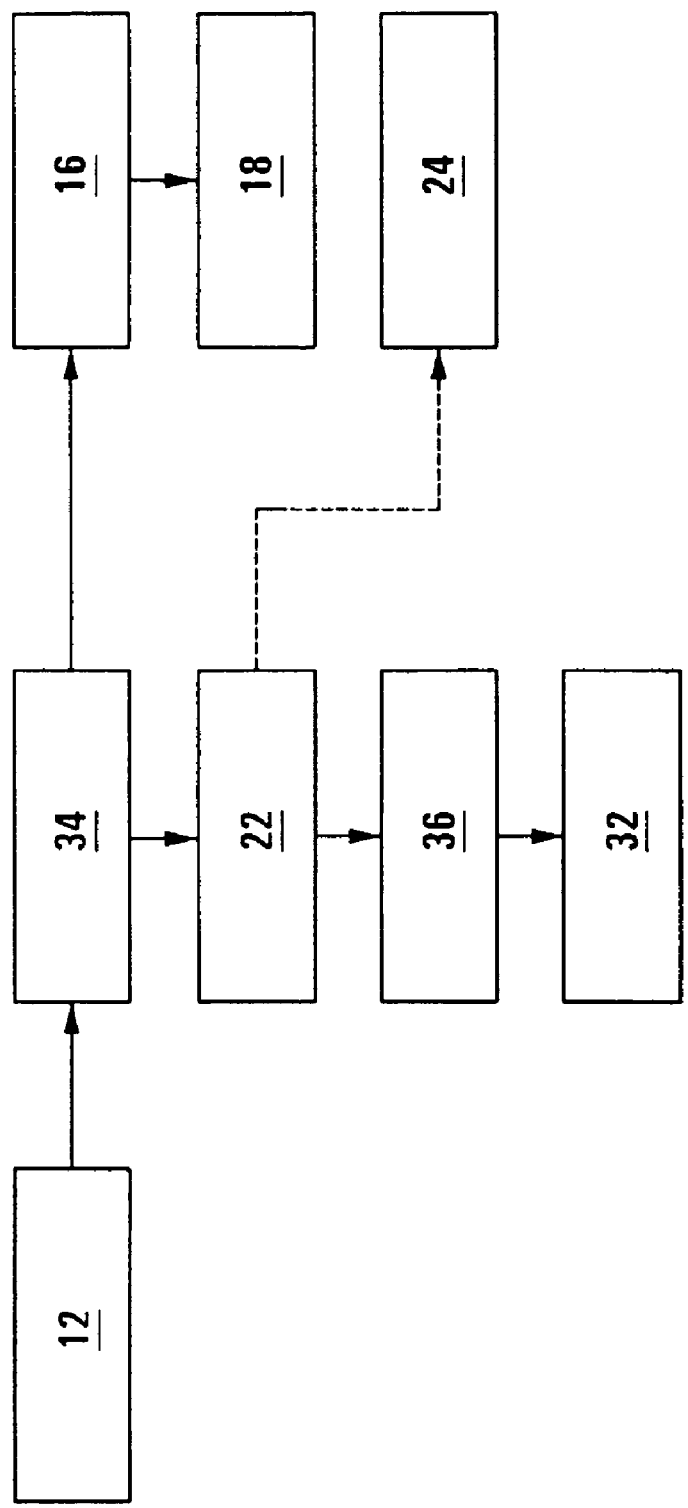

Reference is now made to FIG. 2 of the drawings in which, unless otherwise indicated, the same reference numerals used above are used to designate similar steps.

At 12 the graphite material is reduced to particulate form by methods similar to those described with reference to FIG. 1 above.

At 34, the graphite particulate material is heated under pressure in a chamber in the presence of a gaseous oxidising agent, such as, for example, oxygen or fluorine, so as to yield carbon compounds in gaseous suspension and/or gaseous oxidation products of carbon.

The gaseous suspension is passed to 16 where fuel particles, if present, are removed from the suspension and treated at 18 as described above.

Radioisotopes are removed from the resulting suspension of graphite particulate material in gaseous fluid at 22, as described for step 22 above in relation to FIG. 1.

At 36, the gaseous fluid containing the graphite particulate material in suspension is dissolved in water to give a slurry. The slurry is passed through a biofilter at 32, as for the method of FIG. 1.

The graphite particulate material which emerges from the biofilter 32 is typically dried, compressed and reconstituted into, for example, structural components for a nuclear reactor.

The Applicant believes that the methods of the invention will provide an effective means for treating radioactive waste material, more particularly radioisotopes contained in graphite from a nuclear reactor or nuclear fuel elements or moderator elements. It is believed that the treatment methods of the invention will yield reactor fuel which is more suitable for long term storage, the volume of the fuel effectively being reduced by up to about as much as 95% by the removal of the surrounding graphite and long life fission products having been transmutated to shorter-lived species so that storage is better facilitated. It is believed that graphite particulate material which emerges from the process of the invention will be susceptible of re-use and can be reconstituted as structural elements for a nuclear reactor.

In a gas-cooled reactor, the handling of carbon-14, as well as of other nuclides, is particularly important. Any release/escape of carbon-14 into the atmosphere is not desirable from an environmental viewpoint and affects the ability to date by use of carbon-dating methods. The Applicant believes that the method of the invention, incorporating the step of biological treatment with bacteria to remove carbon-14 and other nuclides, will alleviate these problems.

The invention claimed is:

1. A method of treating irradiated material comprising, reducing irradiated material to particulate form to yield particulate irradiated material;
suspending the particulate irradiated material, or derivatives thereof, in a fluid to form a suspension;
reducing the size of the suspended particulate irradiated material;
thereafter, removing radioisotopes from the suspension by separating the particulate irradiated material out of suspension,
mixing the so-separated particulate irradiated material with water to yield a slurry, and
biologically treating the slurry.

2. A method as claimed in claim 1, in which the irradiated material includes material derived from a structural component of a nuclear reactor or from nuclear fuel or moderator elements.

3. A method as claimed in claim 1, in which the irradiated material comprises a graphite material.

4. A method as claimed in claim 1, in which biologically treating the slurry includes passing the slurry through a biofilter.

5. A method as claimed in claim 1, which includes measuring levels of radioisotopes present in the slurry after biological treatment of the slurry and, where the levels exceed a predetermined maximum value, recycling the slurry for further biological treatment.

6. A method as claimed in claim 1, in which reducing the size of the suspended particulate irradiated material includes milling or grinding the particles in suspension.

7. A method as claimed in claim 1, inclusive, which includes, where the irradiated material is derived from nuclear fuel elements comprising graphite material and fuel particles dispersed therein, separating the fuel particles out of the suspension prior to removing the radioisotopes from the suspension.

8. A method as claimed in claim 7, which includes exposing the separated fuel particles to neutron radiation in order to induce nuclear transmutations of fission products to shorter-lived species.

9. A method as claimed in claim 8, in which the neutron radiation has an energy of at most 4 eV.

10. A method as claimed in claim 8, which includes extracting heat generated during neutron uptake by the fission products for use in downstream or external processes.

11. A method as claimed in claim 1, in which reducing the irradiated material to particulate irradiated material includes crushing the irradiated material.

12. A method as claimed in claim 1, in which reducing the irradiated material to particulate form includes suspending the irradiated material in a liquid medium and subjecting the irradiated material to mechanical vibrations.

13. A method as claimed in claim 12, in which the vibrations are low frequency vibrations.

14. A method as claimed in claim 12, in which the vibrations are high frequency vibrations.

15. A method as claimed in claim 1, in which reducing the irradiated material to particulate form includes applying high frequency pulsating electric fields to the material.

16. A method of treating irradiated material comprising, reducing irradiated material to particulate form by heating the irradiated material and applying a low temperature fluid to a surface of the heated material to yield particulate irradiated material;
suspending the particulate irradiated material, or derivatives thereof, in a fluid to form a suspension;
reducing the size of the suspended particulate irradiated material and
thereafter, removing radioisotopes from the suspension by biological treatment.

17. A method as claimed in claim 16, in which the low temperature fluid is liquid helium.

18. A method as claimed in claim 16, in which the irradiated material is heated by means of microwave radiation.

19. A method of treating irradiated material comprising, reducing irradiated material to particulate form by cooling the irradiated material to a temperature of between −250 degrees Celsius and −270 degrees Celsius and thereafter rapidly heating the material to a temperature of between 180 degrees Celsius and 200 degrees Celsius, to yield particulate irradiated material;
suspending the particulate irradiated material, or derivatives thereof, in a fluid to form a suspension;
reducing the size of the suspended particulate irradiated material and
thereafter, removing radioisotopes from the suspension by biological treatment.

20. A method as claimed in claim 19, in which cooling the irradiated material includes immersing the material in a cooling fluid at a temperature of between −250 degrees Celsius and −270 degrees Celsius.

21. A method as claimed in claim 19, in which rapidly heating the irradiated material includes immersing the material in a fluid medium which is heated to between 180 degrees Celsius and 200 degrees Celsius.

22. A method of treating irradiated material comprising,
reducing irradiated material to particulate form to yield particulate irradiated material,
suspending the particulate irradiated material, or derivatives thereof, in a liquid by forming an emulsion of the particles in the liquid,
reducing the size of the suspended particulate irradiated material and
thereafter, removing radioisotopes from the emulsion by biological treatment.

23. A method as claimed in claim 22, which includes, prior to forming the emulsion, heating the particles to 200 degrees Celsius.

24. A method of treating irradiated material comprising,
reducing irradiated material to particulate form to yield particulate irradiated material;
suspending the particulate irradiated material, or derivatives thereof, in a fluid to form a suspension;
reducing the size of the suspended particulate irradiated material;
removing radioisotopes from the suspension by directing the suspension along a flow path, deflecting radioisotopes from the suspension towards an isotope collection zone defined along a length of the flow path, and collecting isotopes in the isotope collection zone; and thereafter, removing radioisotopes from the suspension by biological treatment.

25. A method as claimed in claim 24, in which collecting the radioisotopes includes embedding the isotopes in an isotope deposition bed which includes at least one layer of an isotope diffusion-resistant material selected from the group consisting of graphite, chromium, platinum, a chromium alloy, silicon carbide, SiN, SiFC and diamond.

26. A method as claimed in claim 25, which includes, where the isotope deposition bed includes at least one layer of fluid deposition material, removing and replacing the fluid deposition material of the isotope deposition bed.

27. A method as claimed in claim 26, which includes circulating the fluid deposition material and subjecting the fluid deposition material to a secondary isotope removal step, which includes directing the fluid deposition material along a flow path, deflecting isotopes from the fluid deposition material towards an isotope collection zone or series of isotope collection zones defined along a length of the flow path, and collecting isotopes in the isotope collection zone.

28. A method as claimed in claim 24, in which collecting the radioisotopes includes providing an endless passage and channeling the isotopes therein.

29. A method as claimed in claim 28, in which channeling the radioisotopes in the endless passage includes applying a magnetic field across the endless passage.

30. A method as claimed in claim 24, inclusive, in which deflecting the radioisotopes from the suspension includes applying a magnetic field across the flow path such that charged isotopes are magnetically deflected in the flow path.

31. A method of treating irradiated material, which method includes the steps of reducing irradiated material to particulate form to yield particulate irradiated material;
suspending the particulate irradiated material, or derivatives thereof, in a gas to form a gaseous suspension;
dissolving the gaseous suspension in water to yield a slurry; and thereafter biologically treating a slurry, thereby to remove radioisotopes from the suspension.

32. A method as claimed in claim 31, in which biologically treating the slurry includes passing the slurry through a bio-filter.

33. A method as claimed in claim 32, which includes measuring levels of radioisotopes present in the slurry after biological treatment of the slurry and, where the levels exceed a predetermined maximum value, recycling the slurry for further biological treatment.

34. A method as claimed in claim 31, which includes the step of reducing the size of the particulate irradiated material suspended in the fluid prior to removing radioisotopes from the suspension.

35. A method as claimed in claim 34, in which reducing the size of the suspended particulate irradiated material includes milling or grinding the particles in suspension.

36. A method as claimed in claim 31, which includes, where the irradiated material is derived from nuclear fuel elements comprising graphite material and fuel particles dispersed therein, separating the fuel particles out of the suspension prior to removing the radioisotopes from the suspension.

37. A method as claimed in claim 31 inclusive, in which reducing the irradiated material to particulate irradiated material includes crushing the irradiated material.

38. A method as claimed in, claim 31, in which reducing the irradiated material to particulate form includes suspending the irradiated material in a liquid medium and subjecting the irradiated material to mechanical vibrations.

39. A method as claimed in claim 31, in which reducing the irradiated material to particulate form includes applying high frequency pulsating electric fields to the material.

40. A method as claimed in claim 31, in which reducing the irradiated material to particulate form includes heating the irradiated material and applying a low temperature fluid to a surface of the heated material.

41. A method as claimed in claim 31, in which reducing the irradiated material to particulate form includes cooling the irradiated material to a temperature of between −250 degrees Celsius and −270 degrees Celsius and thereafter rapidly heating the material to a temperature of between 180 degrees Celsius and 200 degrees Celsius.

42. A method as claimed in claim 31 inclusive, in which suspending the particulate irradiated material or derivatives thereof in the fluid includes heating the particulate irradiated material in the presence of an oxidising agent to yield particulate irradiated material derivatives in the gaseous suspension.

43. A method as claimed in claim 31, which includes removing radioisotopes from the suspension prior to biological treatment of the suspension by directing the suspension along a flow path, deflecting radioisotopes from the suspension towards an isotope collection zone defined along a length of the flow path, and collecting isotopes in the isotope collection zone.

* * * * *